Patented Jan. 10, 1950

2,494,341

UNITED STATES PATENT OFFICE 2,494,341

LUBRICANT COMPOSITION

Eugene Lieber, New York, N. Y., assignor to Standard Oil Development Company, a corporation of Delaware No Drawing. Application August 17, 1945,
Serial No. 611,238

11 Claims. (Cl. 252—59)

This invention relates to novel chemical polymerization and condensation products and the uses thereof, particularly as pour depressors in waxy mineral lubricating oils.

One object of the present invention is to put to valuable commercial uses various organic sulfur compounds which at the present time are considered waste products or low cost by-products. Such sulfur compounds include petroleum refinery mercaptans, which have a very disagreeable odor, and other sulfur compounds such as thioethers. According to the present invention, the sulfur is essentially all removed from such sulfur compounds and the residual portion of the sulfur compound generally becomes hydrocarbon in nature and is converted either by polymerization or condensation with other compounds particularly aromatic compounds into valuable products.

Broadly, the invention comprises treating an organic sulfur compound either alone by polymerization, or in the presence of an aromatic compound condensable therewith, with a Friedel-Crafts catalyst, to produce polymerization and/or condensation of the hydrocarbon portion of the organic sulfur compound. The invention may be typified by the reaction of amyl mercaptan with naphthalene in the presence of aluminum chloride with the production of other high molecular weight non-volatile condensation products which is a valuable pour depressor for a waxy mineral lubricating oil.

The organic sulfur compound that could be used is preferably one having the general formula R—S—X in which R represents an alkyl group having 1 to 20 or more carbon atoms, preferably 2 to 8 carbon atoms and X represents either hydrogen or a hydrocarbon group. Thus, in the case of mercaptans the general formula is RSH, and in the case of thioethers the formula may be RSR' or R—S—S—R' or

in which R and R' may be like or unlike aliphatic hydrocarbon radicals. Mixed petroleum refinery mercaptans, for instance, including methyl, ethyl, normal propyl, isopropyl, butyl, amyl or higher mercaptans, may be used, or various fractions thereof which may either be separated according to boiling point or other suitable means. Individual pure mercaptans may be used or mixed isomers may be used, such as a commercially available mixture of mercaptans iso-octyl (di-isobutyl) mercaptans may also be used. Even higher mercaptans may also be used, such as lauryl mercaptans, octadecyl mercaptans, kerosene mercaptans, of wax mercaptans, etc. By these latter two expressions, it is meant a mercaptan either naturally present in the particular petroleum fractions referred to or to mercaptan derivatives derived either as the main product or by-product of a chemical reaction involving such petroleum fractions.

Examples of some of the thioethers which may be used include

Di-amyl thio-ether
Di-octa decyl di-sulfide
Di-lauryl thio-ether
Di-kerosene-thio-ether The aromatic compounds which may or may not be present during the treatment of the aliphatic organic sulfur compound with a Friedel-Crafts catalyst is preferably an aromatic hydrocarbon such as benzene, toluene, xylene, naphthalene, phenanthrene, anthracene, mixed coal tar aromatics, etc., but may also be various substituted derivatives thereof, such as phenol, cresol, xylenols, naphthol, amylphenol, mixed petroleum phenol, etc. or amino derivatives such as aniline, xylidine, etc.

The preferred catalyst is aluminum chloride, although other Friedel-Crafts catalyst may be used, e. g. $ZnCl_2$, $BF_3$, $AlBr_3$, HF, etc. although generally these are weaker catalysts and require stronger reaction conditions to effect the desired condensation reaction.

The proportions to be used in the case of autocondensation of these aliphatic and mixed aliphatic-aromatic organic sulfur compounds should generally comprise about 0.1 to 3 mols of catalyst per mol of the organic sulfur compound, about 0.5 to 1 or 2 mols of catalyst usually being sufficient. If the organic sulfur compound containing at least one aliphatic hydrocarbon radical is condensed with an aromatic compound, about 0.5 to 5 mols, preferably about 1 to 3 mols, of the sulfur compound should be used per mol of the aromatic compound and about 0.1 to 3 mols of catalyst should be used.

In carrying out the reaction the use of an inert solvent is thought desirable as it permits better control of the reaction. Suitable materials include saturated hydrocarbon liquids such as a refined naphtha or kerosene, or highly chlorinated hydrocarbons such as tetrachloroethane or dichlorobenzene, etc. If a solvent is used, generally about ½ to 10 volumes, preferably about 1 to 5 volumes, of solvent should be used per volume of reactant.

The temperature at which the condensation should be carried out may range from about room temperature up to about 400° F. The preferred procedure is to add the catalyst to the organic sulfur compound, alone or in admixture with the aromatic compound, and in solution to the inert solvent if one is used, at or near room temperature, and then after any initial reaction has subsided heat the mixture to a finishing temperature between the approximate limits of about 150° and 350° F. or so for a reaction time of about ½ to 10 hours or so.

After the desired condensation reaction has been completed, the condensation product may be recovered by any suitable means, but the preferred procedure is to dilute the reaction mass with a suitable diluent such as refined kerosene, then hydrolyze any residual catlyst by adding water, alcohol, aqueous caustic soda, or dilute acid, or any mixture thereof, then settling and removing the catalyst sludge, washing the kerosene extract with water and then either cooling the extract solution to crystallize out any crystallizable low molecular weight condensation products, but preferably distilling the extract to remove overhead the kerosene or other solvent or diluent used, together with any low boiling condensation product or unreacted raw material, and in order to obtain as distillation residue a high molecular weight substantially non-volatile condensation product. Such distillation is preferably carried out under reduced pressure, such as a vacuum distillation under an absolute pressure of about 5 to 50 ml. mercury, or by fire or steam distillation, up to a final temperature of about 600° F.

As the exact mechanism of the operation on the present invention is not well understood, but it is believed that the high molecular weight condensation products having the most valuable pour depressing properties, generally have an average molecular weight of about 700 to 2000 or higher and represents mixtures of various types of molecules, most of which probably are not simple monomeric alkylated aromatic compounds but probably contain at least two aromatic nuclei interlinked by alkylene group, and probably having one or more alkyl groups also attached to each aromatic nucleus.

In the case of auto-condensation of the organic sulfur compound the following reactions are probably involved:

1. $RSH = (R)_n + nH_2S$

This reaction may involve the preliminary activation of the alkyl mercaptan with the resulting formation of the corresponding olefin, which then polymerizes.

2. $RSR' = (R)_n + (R')_n + (R-R')_n + nH_2S$

In such a case there may also be some interlinking of the primary products indicated, but if R is aliphatic and R' is an aromatic radical then products having the general formula $(R')_n$ would probably not be present to any substantial extent in the reaction products.

In the case of condensation of the organic sulfur compound with aromatic compound, several probable reactions include the following:

3. $Ar + RSH = (Ar-R)_n + nH_2S$

4. $Ar + R-S-R' = (Ar-R)_n + (Ar-R')_n + (R-Ar-R')_n + nH_2S$

In this latter case, some auto-condensation of the sulfur compound may also take place that results in formation of the various products listed above under "2". The new condensation products of this invention may also, if desired, be added to other types of petroleum oils such as gasoline, kerosene, Diesel fuels, domestic heating oils, etc. or to products such as paraffin wax and asphalt, or they may be added to other types of materials such as fatty oils, resins, rubber, synthetic rubber, etc.

The condensation products of this invention, particularly the high molecular weight ones referred to above, have been found to have a valuable wax modifying, especially pour depressing, properties when added to waxy mineral lubricating oils in a concentration of about 0.5 to 2%, about 0.1 to 1% generally being sufficient.

The objects, advantages, and details of the invention will be better understood from a consideration of the following experimental data:

*Example 1*

The following proportions of reagents were used:

Naphthalene, 64 grams
Aluminum chloride, 135 grams
Amyl mercaptan, 52 grams
Kerosene as solvent, 400 cc.

The naphthalene, aluminum chloride and kerosene were placed in a suitable reactor and with agitation the mercaptan was added to this mixture over a period of 30 minutes. When all of the mercaptan had been added, the temperature was raised to 300° F. and maintained thereat for 3 hours. During the course of the reaction, hydrogen sulfide gas was eliminated as well as hydrogen chloride. At the end of the reaction period the mixture was cooled, diluted with a further quantity of kerosene and neutralized with an alcohol-water mixture. After settling and drawing off the aqueous layer, the kerosene extract was washed with a further quantity of alcohol-water mixture. The product was then recovered by a fire and steam distillation to 600° F. in order to remove solvent and low boiling products. A yield of 117 grams of a brown viscous oil was obtained as product.

When 5% of the condensation product prepared as described above was added to a paraffinic wax-containing oil, whose initial pour point was +30° F., a final pour point was found to be 0° F.

*Example 2*

The procedure of Example 1 was repeated exactly except that the following proportions of reagents were used:

Naphthalene, 128 grams
Aluminum chloride, 270 grams
Amyl mercaptan, 104 grams
Tetra-chloro-ethane as solvent, 500 cc.

and the final reaction temperature was maintained at 150° instead of 300° F. for 3 hours. The product was recovered as previously described and a yield of 103 grams of a very hard deep brown resin was obtained as product.

The pour depressant potency of the condensation product prepared as described above was tested in the same wax-containing oil as used in Example 1. The following results were obtained:

|  | Pour Point °F. |
| --- | --- |
| Original oil | +30 |
| Original oil + 2% condensation product | 0 |
| Original oil + 5% condensation product | −10 |

Example 3

The following proportion of reagents were used:

Benzene, 78 grams
Aluminum chloride, 270 grams
Amyl mercaptan, 104 grams
Kerosene as solvent, 400 cc.

The procedure described in Example 2 was followed exactly. A yield of 57 grams of crude material was obtained as product. This was submitted to a vacuum distillation at approximately 10 mm. Hg to a vapor temperature of about 150° C. and a bottoms residue weighing 21 grams was obtained comprising a dark brown very viscous oil.

The condensation product prepared as described above was tested in the same wax-containing oil as used in Example 1. The following results were obtained:

|  | Pour Point °F. |
| --- | --- |
| Original oil | +30 |
| Original oil + 5% condensation product | −5 |
| Original oil + 10% condensation product | −20 |

The above tests show quite unexpectedly that condensation products having pour-depressing properties can be made from aliphatic organic sulfur-containing compounds, such as amyl mercaptans, particularly when condensed with some aromatic hydrocarbon such as naphthalene or benzene.

It is not intended that this invention be limited to the particular materials which have been recited merely for the sake of illustration, but only by the appended claims in which it is intended to claim all novelty inherent in the invention as well as all modifications coming within the scope and spirit of the invention.

What is claimed is:

1. Process which comprises condensing 0.5 to 5 mols of an alkyl mercaptan having from 1 to 20 carbon atoms with 1 mol of an aromatic compound selected from the class consisting of aromatic hydrocarbon and hydroxy derivatives thereof, in the presence of a Friedel-Craft catalyst at a reaction temperature between the approximate limits of room temperature and about 400° F., sufficiently elevated to produce high molecular weight polymeric condensation products, hydrolyzing and removing the catalyst and recovering from the reaction mixture a high molecular weight substantially non-volatile condensation product.

2. Process according to claim 1 carried out in the presence of about ½ to 10 volumes of inert solvent per volume of reactant.

3. Process according to claim 1 in which the alkyl mercaptan is reacted with an aromatic hydrocarbon.

4. Process according to claim 1 using at least 0.5 mol of aluminum chloride as catalyst per mol of organic sulfur compound.

5. The process which comprises reacting about 0.5 to 5 mols of an alkyl mercaptan having 2 to 8 carbon atoms with about one mol of an aromatic hydrocarbon having less than 20 carbon atoms, in the presence of about ½ to 10 volumes of inert solvent per volume of mixed reactant, and in the presence of about 0.5 to 2.0 mols of aluminum chloride as catalyst, using a reaction temperature between the approximate limits of about room temperature and 450° F., hydrolyzing and removing the catalyst, and subjecting the reaction product to distillation under reduced pressure up to the range, 500–600° F. to obtain the desired high molecular weight condensation product as distillation residue.

6. Process which comprises reacting about 1 to 3 mols of amyl mercaptan with about 1 mol of naphthalene in the presence of about 1 to 5 volumes of inert solvent per volume of mixed reactant, and in the presence of about 0.5 to 2.0 mols of aluminum chloride as catalyst, using a final reaction temperature of about 150° F. to 350° F. for about ½ to 10 hours, diluting the reaction mixture with a further amount of inert solvent, hydrolyzing and removing residual catalyst, and subjecting the reaction mixture to fire and steam distillation, up to 600° F. to remove solvent and low-boiling products, and to leave the desired high molecular weight condensation products as distillation residue.

7. Product consisting essentially of an oil-soluble condensation product of 0.5 to 5 mols of an alkyl mercaptan having from 1 to 20 carbon atoms, with 1 mol of an aromatic hydrocarbon condensable therewith and having less than 20 carbon atoms, said condensation product being formed by the condensation of said alkyl mercaptan and said aromatic hydrocarbon using a final reaction temperature of about 150° F. to 350° F., having a molecular weight of at least 700 and being substantially non-volatile to reduced pressure up to about 600° F.

8. An oil-soluble condensation product of 0.5 to 5 mols of amyl mercaptan and 1 mol of naphthalene, said condensation product being formed by the condensation of said amyl mercaptan and said naphthalene using a final reaction temperature of about 150° F. to 350° F., having a molecular weight of at least about 700, being substantially non-volatile under fire and steam distillation up to 600° F., and having wax modifying properties.

9. An oil-soluble aluminum chloride condensation product of 0.5 to 5 mols of an alkyl mercaptan having 2 to 8 carbon atoms with 1 mol of an aromatic compound selected from the class consisting of benzene and naphthalene, said condensation product being formed by the condensation of said amyl mercaptan and said aromatic compound using a final reaction temperature of about 150° F. to 350° F., being substantially non-volatile under fire and steam distillation up to about 600° F., and having an average molecular weight of at least about 700.

10. A lubricant comprising a major proportion of a waxy mineral lubricating oil and a pour-depressing amount of an oil-soluble condensation product of 0.5 to 5 mols of an alkyl mercaptan having from 1 to 20 carbon atoms, with 1 mol of an aromatic compound having less than 20 carbon atoms and selected from the class consisting of aromatic hydrocarbons and hydroxy derivatives thereof, said condensation products being formed by the condensation of said alkyl mercaptan and said aromatic compound using a final reaction temperature of 150° F. to 350° F., having an average molecular weight of at least about 700 and being substantially non-volatile under reduced pressure up to about 600° F.

11. A lubricant comprising a major proportion of waxy mineral lubricating oil and a pour-depressing amount, between the approximate limits of 0.1% to 10.0% of a condensation product of 0.5 to 5 mols of amyl mercaptan with 1 mol of naphthalene, said condensation product being formed by the condensation of said amyl mercaptan and said naphthalene using a final reaction temperature of about 150° F. to 350° F., having an average molecular weight of at least about 700 and being soluble in paraffinic lubricating oils and being substantially non-volatile under fire and steam distillation up to about 600° F.

EUGENE LIEBER.

REFERENCES CITED

The following references are of record in the file of this patent:

UNITED STATES PATENTS

| Number | Name | Date |
|---|---|---|
| 2,141,611 | Malishev | Dec. 27, 1938 |
| 2,205,858 | Mikeska | June 25, 1940 |
| 2,324,784 | Lieber | July 20, 1943 |
| 2,327,705 | Frolich | Aug. 24, 1943 |
| 2,336,195 | Sparks | Dec. 7, 1943 |
| 2,366,453 | Meadow | Jan. 2, 1945 |
| 2,382,700 | Eby | Aug. 14, 1945 |
| 2,403,013 | Meadow | July 2, 1946 |
| 2,423,530 | Thacker et al. | July 8, 1947 |